(12) United States Patent
Bugrov

(10) Patent No.: US 10,754,629 B2
(45) Date of Patent: Aug. 25, 2020

(54) METHOD FOR AUTOMATED DETECTION, CORRECTION, AND TRANSLATION OF UN-LOCALIZED LINES

(71) Applicant: Ingram Micro, Inc., Irvine, CA (US)

(72) Inventor: Pavel Bugrov, Moscow (RU)

(73) Assignee: Ingram Micro Inc., Plainfield, IN (US)

(*) Notice: Subject to any disclaimer, the term of this patent is extended or adjusted under 35 U.S.C. 154(b) by 0 days.

(21) Appl. No.: 15/710,434

(22) Filed: Sep. 20, 2017

(65) Prior Publication Data

US 2018/0081646 A1    Mar. 22, 2018

Related U.S. Application Data

(60) Provisional application No. 62/397,051, filed on Sep. 20, 2016.

(51) Int. Cl.
| | |
|---|---|
| *G06F 8/41* | (2018.01) |
| *G06F 9/451* | (2018.01) |
| *G06F 8/65* | (2018.01) |
| *G06F 11/36* | (2006.01) |

(52) U.S. Cl.
CPC .............. *G06F 8/43* (2013.01); *G06F 9/454* (2018.02); *G06F 11/3604* (2013.01)

(58) Field of Classification Search
CPC ........................................................ G06F 8/43
See application file for complete search history.

(56) References Cited

U.S. PATENT DOCUMENTS

| | | | | |
|---|---|---|---|---|
| 6,094,529 | A * | 7/2000 | Jeffries | G06F 8/20 717/110 |
| 8,666,948 | B1 * | 3/2014 | Kearns | G06F 17/30371 707/691 |
| 2002/0173946 | A1 | 11/2002 | Christy | |
| 2003/0041110 | A1 * | 2/2003 | Wenocur | G06Q 10/107 709/206 |
| 2005/0050526 | A1 * | 3/2005 | Dahne-Steuber | G06F 9/454 717/136 |
| 2013/0144596 | A1 * | 6/2013 | Lui | G06F 17/2705 704/2 |
| 2014/0164945 | A1 | 6/2014 | Junqua et al. | |
| 2014/0207826 | A1 * | 7/2014 | Gao | G06F 17/30292 707/803 |

(Continued)

OTHER PUBLICATIONS

PCT/US2017/052487, International Preliminary Report on Patentability, International Bureau of WIPO, dated Mar. 26, 2019.

*Primary Examiner* — Lewis A Bullock, Jr.
*Assistant Examiner* — Mohammad H Kabir
(74) *Attorney, Agent, or Firm* — Ice Miller LLP

(57) ABSTRACT

A method for periodic checking of localized lines in the application source code before the assembled application is propagated into message files (*.po). An automated internationalization of lines for all supported application languages is provided. The lines and their translations in locale files (JSON) are validated against the message files (PO). The un-localized lines are checked in the source code using a localization marker. According to the APS, a special trap (i.e., a hook) is used for APS msgmake utility in order to derive localization data from a set of aps_command_line_tools for assembling a user interface. The lines are corrected and loaded back into "*.po" file.

4 Claims, 7 Drawing Sheets

(56) References Cited

U.S. PATENT DOCUMENTS

| | | | |
|---|---|---|---|
| 2015/0113075 A1* | 4/2015 | Vanderwiel | G06F 11/3006 709/206 |
| 2016/0012465 A1* | 1/2016 | Sharp | G06Q 20/18 705/14.17 |
| 2016/0085749 A1 | 3/2016 | Bartley et al. | |
| 2016/0098261 A1 | 4/2016 | Habib et al. | |
| 2017/0249200 A1* | 8/2017 | Mustafi | G06F 11/0709 |

* cited by examiner

| *Source code (\*.js, \*.java); file: DocumentNotificationFactory.java* |
|---|
| private static final String NEW_UNPAID_INVOICE_ISSUED_TITLE = __("New Unpaid Invoice Issued"); |

| *Message file (\*.po); file: es_ES.po* |
|---|
| #: src/main/java/DocumentNotificationFactory.java:59<br><br>*msgid* "New Invoice Issued"<br><br>*msgstr* "" |

METHOD FOR AUTOMATED DETECTION, CORRECTION, AND TRANSLATION OF UN-LOCALIZED LINES

CROSS REFERENCE TO RELATED APPLICATION

The present application is a U.S. nonprovisonal of, and claims the priority benefit of U.S. Application Ser. No. 62/397,051, filed Sep. 20, 2016, the text and drawings of which are hereby incorporated by reference in its entirety.

TECHNICAL FIELD

This invention relates to a method for automated detection of un-localized code lines, and more particularly, to detection, correction and translation of code lines in Application Packaging Standard (APS)-compliant application interfaces.

BACKGROUND

Service automation systems require a large number of applications compliant with the Application Packaging Standard (APS). The Application Packaging Standard (APS) is a standard that defines a technology for integrating application software with hosting platforms. Integration of an application with such hosting platforms is implemented by creating an APS package for the application, and the application is called an APS application in this case. Development on an APS platform allows for universal use of an application on different hosting platforms. Such applications are also deployed in various regions of the world in native languages and/or dialects. In order for such applications to be used, their Graphical User Interfaces (GUI) are sometimes deployed using the local language. For example, where a GUI might have a text element that is in English when presented to a user in the United States (U.S.), the same GUI element may have the same text translated into Russian, when presented to a user in Russia. Using a local language (as opposed to English only) for GUI elements allows for a customized and improved user experience.

Internationalization (i18n) is the process of developing an application such that the strings and other locale-specific bits (such as date or currency formats) can be abstracted out of the application so they can be localized for languages and cultures easily. Localization (l10n), is the process of adapting applications and text to enable their usability in a particular cultural or linguistic market by providing translations and localized formats for the abstracted bits. For example, making a U.S. application accessible to Australian or British users may require a little more than a few spelling corrections. But to make a U.S. application usable by Japanese users, or to make a Korean application usable by German users, will require the software to operate not only in different languages, but also to use different input techniques and presentation conventions.

Developing a GUI (and the GUI elements therein) for each language and for each application is not a viable proposition. The time, effort and money required to develop so-called "language native" GUIs can be burdensome when trying to deploy an application in multiple regions of the world.

To reduce the burden, software and development platforms, such as for example, the APS platform, allow for GUI elements to be localized and translated. This allows for a GUI, when rendered, to be in a language that is native to the region (or the user). However, traditional translations and conversions of the GUI interface elements do not present consistently. This can be because the character set that comprises the alphabet of one language is different from another language; the change in spatial characteristics renders the text in the translated language larger (or smaller); or there is meaning "lost in translation."

Furthermore, when a GUI is developed or improved, the amount of data rendered on the screen to the end user may increase, including any text messages that the user sees as part of the GUI. In particular, the number of lines, marks of the interface elements, and screen forms tend to increase. According to the APS standard, all application interface elements have to be localized and internationalized. However, the interface lines and elements are not always properly formatted after they are included into the application code. As a result, the end user can observe glitches caused by a partial localization and translation of messages inside the application.

For example, referring now to FIG. 1, there is shown an embodiment of a conventional method for translation of un-localized lines of an APS compatible application, generally at 100. The conventional method includes step 102 of collecting the source code; step 104 of importing of localization through msgmake posts; step 106 of creating portable objects (.po) message files; step 108 of transferring the msgmake posts to a technical writer who drafts translations for the un-localized lines; step 110 of adding the translation; step 112 of building the APS package by exporting the localized message in JavaScript Object Notation (JSON); which results at 114 with the APS package with internationalization files.

In the conventional method 100, not all lines can be presented and localized into the interface correctly. The reasons for this can include, but are not limited to, incorrect format of the localities, a processor error, an incorrect key, lack of available translations, or typos or missing files relating to an additional locality, to name a few non-limiting examples. This results in an incomplete implementation of required scenarios and in high costs associated with checks and verifications.

Ideally, the above problems can be prevented in the application development phase. Furthermore, automated and semi-automated checks of correctness of translation of GUI elements are desired. This will help improve the checks and reduce costs associated with manual verification. Lastly, a method for timely detection of localization errors within the application lifecycle management is desired.

Therefore, there is a need for a method for automated detection, correction, and translation of un-localized lines.

SUMMARY

Accordingly, the present disclosure is directed to a method for automated detection, correction and translation of un-localized code lines that substantially obviates one or more of the disadvantages of the prior art (as further discussed below). In one aspect of the present disclosure, a method for periodic checking of localized lines in the application source code before the assembled application is propagated into message files (*.po) is provided. In another embodiment, an automated translation of lines for all supported application languages is provided. The lines and their translations, which are provided in i18n JSON files, are validated against the message files. According to an exemplary embodiment, the un-localized lines are checked in the source code using a localization marker. According to the APS, a special trap (i.e., a hook) is used for aps msgmake utility in order to derive localization data from a set of aps command line tools for assembling a user interface.

DETAILED DESCRIPTION

Reference will now be made in detail to the preferred embodiments of the present invention, examples of which are illustrated in the accompanying drawings.

In at least one embodiment of the present disclosure, a method for periodic checking of localized lines in the application source code before the assembled application is propagated into message files (*.po) is provided. In another embodiment, an automated internationalization of lines for all supported application languages is provided. The lines and their translations are validated against the message files (*.po).

Figure 1:
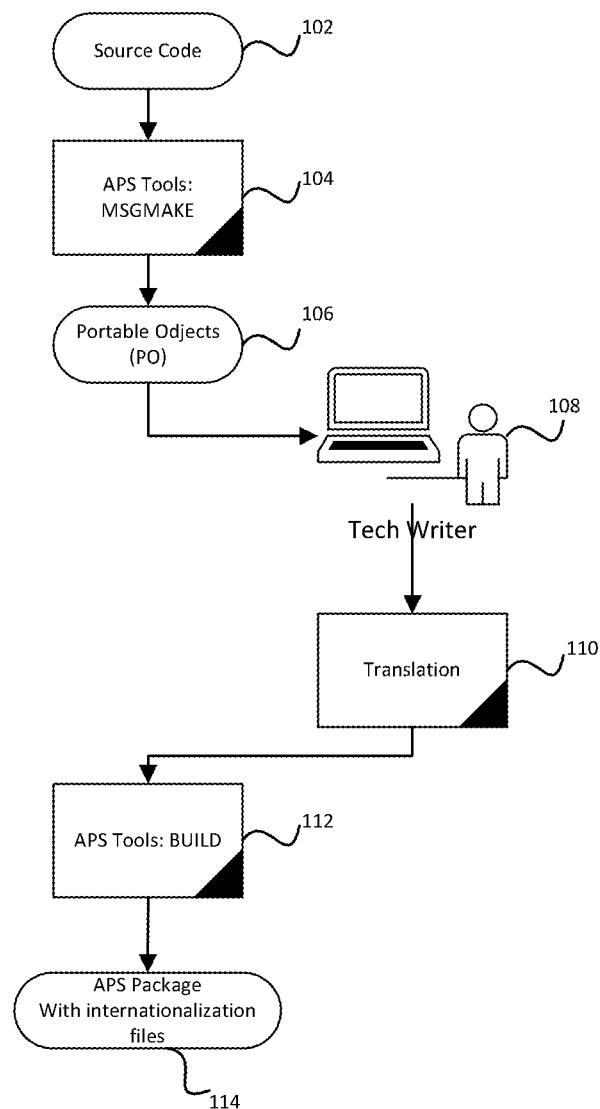
FIG. 1 displays a schematic drawing of an existing process of manual translation of code lines by technical writer.
Figure 2:
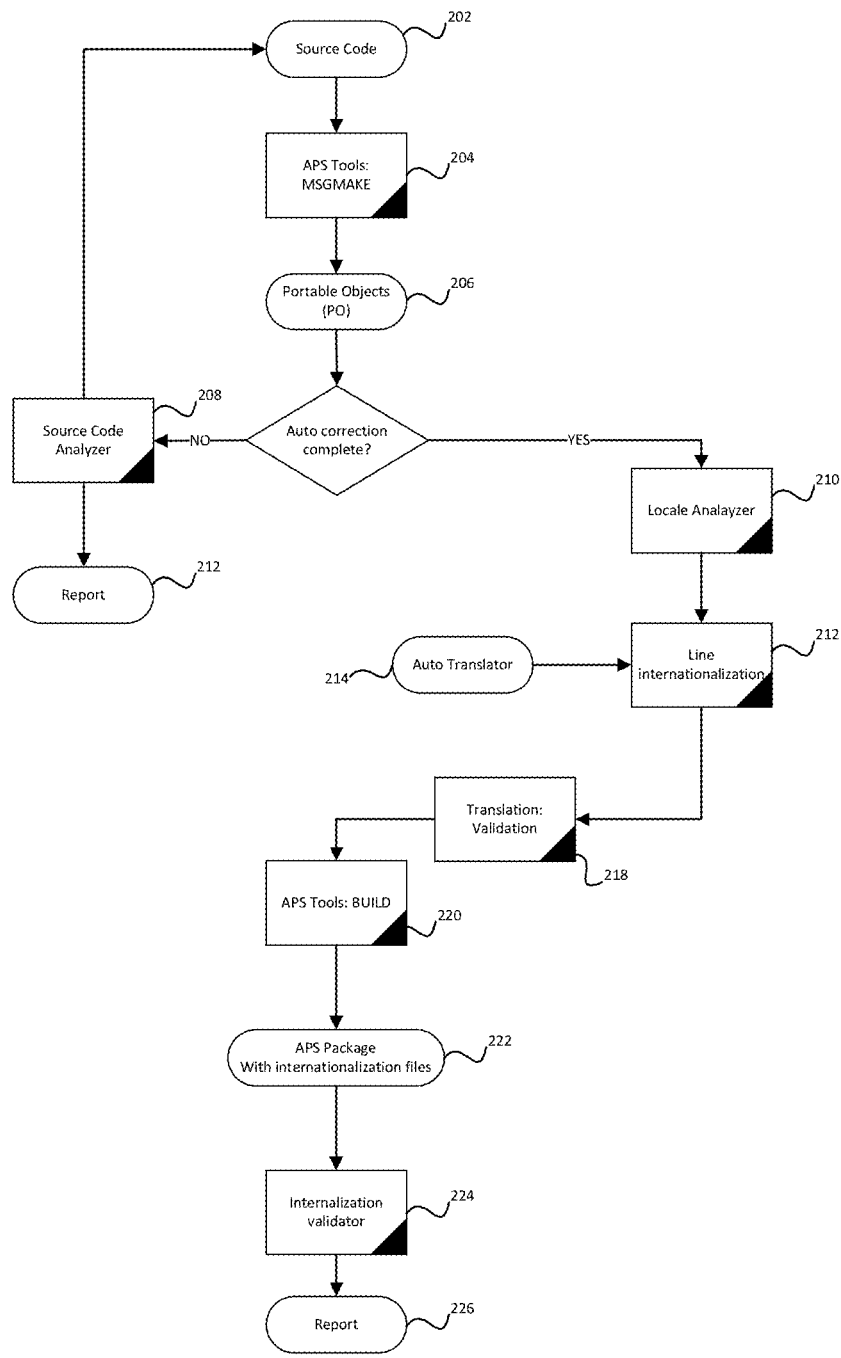
FIG. 2 displays a schematic drawing of a suggested method for automated detection, correction, and translation of un-localized lines.

According to the exemplary embodiment and with reference to FIG. 2, the localized lines are marked in the source code 202 using a localization marker. In an embodiment using the APS, a special trap (i.e., a hook) is used for the aps msgmake utility 204 in order to derive localization data from a set of aps command line tools for assembling a user interface. The aps msgmake command extracts the translation strings into message files (*.po), one file per language. A .po message file is a plain-text file, representing a single language that contains all available translation strings and their interpretation (translation) in the given language. This file is a convenient way for translators to provide the interpretation of the translation strings in the target language. The .po message file is made up of many entries, each entry describes the relation between an original untranslated string and its corresponding translation:

msgid "[Original translation string is here]"
   msgstr "[Translated string is here]"

Using the above example, a translation in Spanish can be expressed as follows:

msgid "Diskspace—Usage Only"
   msgstr "Espacio en disco—Solamente Uso"

According to the exemplary embodiment, two exemplary formats of a hook (i.e., a localization marker) are used:

| JavaScript files (*.js) | Java files (*.java) |
|---|---|
| _("message") | __("message") |

The pair of underscores for *.java and single underscore for *.js function is a hook that makes a string available for translation. For example, _("string to translate") makes the aps msgmake command create the msgid "string to translate" and msgstr "translated string" pair in .po files 206. In the general case, a string may contain mapped parameters that should not be translated. The mapped parameters must be enclosed between a pair of underscores "_". In the following example, the msgKey string contains parameters, which values must be found in the paramObjects mapping string:

_(msgKey, paramObjects)

It will be further appreciated that the localization marker can be used in a short or full format. For example:

```
JavaScript (*.js):
Short format: _("User__username__created")
Full format: _("User__username__created", {"username":"John Smith"})
Java (*.java):
Short format: __("User__username__created")
Full format: __("User__username__created", {"username":"John Smith"})
```

Figure 7:
FIG. 7. illustrates software code for a localization marker in accordance with one embodiment.
Figure 7:

Accordingly, all of these lines are added into the .po message file, and subsequently into JSON as shown in FIG. 7.

The _( ) function is used to localize the string @msgKey. For example, @msgKey is actually a string "Found_itemsCount_item(s)." This string contains the itemsCount parameter, wrapped by a pair of underscores. The parameter is defined by the mapping string {"itemsCount":counter}. So, if aps msgmake meets the following code when parsing a JavaScript code:

_("Found_itemsCount_item(s)", {"itemsCount":itemsCount})

it automatically generates the following pair of records in the .po message file:

msgid "Found__itemsCount__item(s)"
   msgstr ""

The resulting .po message file 206 is considered to be correct and is used as a basis for a dictionary of localization samples (i.e., localization patterns). Since the variability of code is rather high, it is impossible to determine the lines to be localized in the product source code with a high degree of accuracy. According to the exemplary embodiment, the lines of the source code of the keys that have been written into the .po message file of native locality en_US.po are automatically considered and collected as the localization samples.

As shown in FIG. 2, a source code analyzer 208 may be used to review various sources of code 202. Once a line with a localization marker is found, the source code analyzer 208 saves everything preceding the localization marker within the current line into a database (i.e. database 656):

| Pattern | Timestamp | FileExtention |
|---|---|---|
| label: | 2016-04-10 0:00:00.000 | JS |

The above record is called the localization pattern. For example in the following:

var warn=_("Assign the serviceName service to yourself to start using it.", {serviceName: serviceConstants.SERVICE_NAME}, the localization sample will be "var warn="

According to the exemplary embodiment, the localization samples (patterns) are generated based on a plurality of rules. In at least one embodiment of the present disclosure, If a line in the *.java file contains a declaration of the text constant (i.e., a text "static final String" or "final static"), the application considers everything positioned before the string including the actual word "String" to be a localization pattern. Thus, for the string public final static String PASSWORD_NOT_CHANGED=_("Password Not Changed") the localization pattern is public final static String.

When there is no text in front of the localization marker (e.g., in a multi-line string), the source code analyzer 208 takes everything located one line above as a localization pattern. If the above line contains a string with the localization marker, the application moves to the next line above. For example, for a line:

```
return runNotification(apsAccountUuid, apsUserUuid, ( ) -> {
return buildNotification(apsAccountUuid, apsUserUuid, entity,
    domainName,
NotificationMessageStatus.inProgress,
    _("Assigning Domain"),
    _("Assigning of domain \"{domain}\" is in progress."),
    _("Assigning of domain \"{domain}\" is in progress. "+
    "It can take several minutes to complete."))
        .send( );
                                });
``` the localization pattern is:
return buildNotification (apsAccountUuid, aps UserUuid, entity, domainName, NotificationMessageStatus.inProgress).

If the multi-line string is encountered during a search based on an already generated localization pattern, the source code analyzer 208 reads the string to the semicolon, which is interpreted as a string end. All other borderline cases are resolved during a code review so the mechanism of creation of localization patterns is implemented within the same standard. According to one exemplary embodiment, the localization marker is added automatically, after a list of localization patterns is formed. After a list of localization patterns is formed, the source code analyzer 208, using the saved localization patterns, looks for entries in all files with the particular FileExtention (e.g., JS). For example, if there is a sample label: marker, then find the end of the line where this is a sample string marker (e.g. double quotes), and then extend this string with alocalization marker if it did not exist. For example:

Label: "test string"--->label:_("test string")

Then, a line propagation process (wherein all code lines with a localization marker are moved to PO files), via the aps msgmake tool is implemented as shown in FIG. 2. At step 204, the aps msgmake facilitates placing the content which is placed inside the quotation marks inside the message file (*.po) and this becomes a localization key.

After all of the localization keys are added into the .po message file of the native locality (e.g. "en_US.po"), a locale analysis is started 210. Locale analyzer parse a native language *.po message file for all the existing msgID's. After that the tool compares the native and additional languages files and extends the additional languages files with msgID's which are not presented in it. Then the line internationalization process 212 is started using any of the available libraries configured for working with gettext files (*.po) 214. It will be appreciated that gettext files are based on an internationalization and localization (i18n) system commonly used for writing multilingual programs. For example, for the Python programming language, the "Polib" library can be used. Google Translate API can be used for automated translation of lines.

For each msgID (strings in *po files consist of a keys), a translation request is sent to a translation engine, like Google Translate using the Google Translate API in JSON format, to name one non-limiting example.

If the request is executed successfully, the server returns an "OK" response and a translation result in JSON:

```
200 OK
{
  "data": {
    "translations": [
      {
        "translatedText": "Nueva factura emitida" (Spanish)
      }
    ]
  }
}
```

According to the exemplary embodiment, the translation is requested for all languages supported by the APS application or only for the languages having the .po message file present in the system. The translation selection is made based on an internationalization script launching mode. The translated lines are also written into the database (i.e. database 656) in the following format:

| Key | Value | Timestamp | LocaleCode |
|---|---|---|---|
| New Invoice Issued | Nueva factura emitida | 2016-04-10 0:00:00.000 | es_ES |
| New Invoice Issued | Nieuwe factuur Uitgegeven | 2016-04-10 0:00:00.001 | de_DE |

According to the exemplary embodiment, the appropriate translated lines are written into appropriate gettext files. Then the translation validation manual process 218 is started. Responsible Tech Writer reviews strings that were automatically translated.

At step 220. after the APS application (i.e., APS package 222) is assembled, the content of the message file (*.po) is converted into the localization file *.json.

According to the exemplary embodiment, the lines are validated between the .po message files and JSON 224. After the package is assembled, the validation script imports all of the localization keys and the corresponding localization values from the .po message files. Then, the script checks for the file with the same name and the file extension *.json. Subsequently, the script compares the keys and the values loaded into memory against the keys and the values in the JSON file. If the key or the value is not found, an automated error report is created 226, and can be sent to an application developer, to name one non-limiting example.

Figure 3:
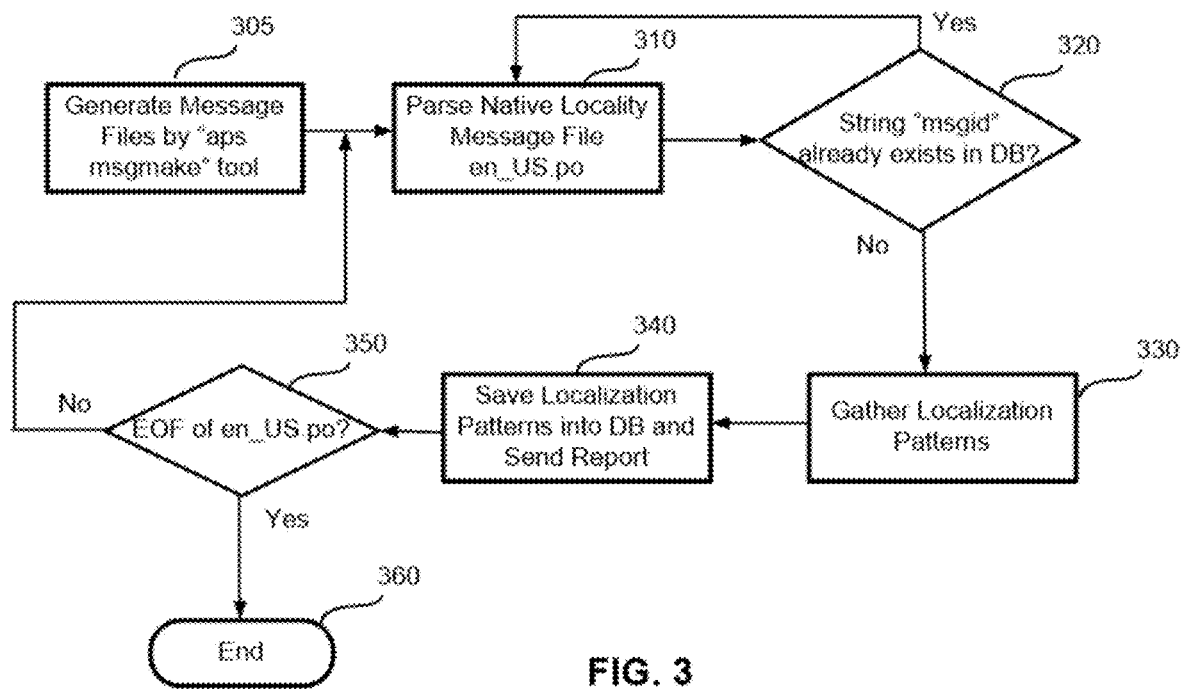
FIG. 3 displays a flowchart of a method for automated detection and collection of localization patterns.

Referring now to FIG. 3, there is shown a flowchart of a method for checking for un-localized lines in a source code populating a database with localization samples, in accordance with one embodiment of the present disclosure. In step 305, the .po message files are generated by an aps msgmake tool as disclosed above. In at least one embodiment of the present disclosure, the aps msgmake command extracts the translation strings into .po message files, one file per language. This file is a convenient way for translators to provide the interpretation of the translation strings in the target language. The aps msgmake utility uses a special trap (i.e., a hook) in order to derive localization data from a set of aps command line tools for assembling a GUI.

In step 310 a native locality .po message file is parsed. For example, en_US.po is a locality .po message file for the English language (en) in the United States (US). The .po message file name is in the form of ll_CC.po. The two-letter primary code (ll) is defined by the ISO 639-1 language specification. The two-letter subcode (CC) is interpreted according to the ISO 3166-1 country specification. The language part is always written in lower case and the country part in upper case. The separator is underscore ("_"). In at least one embodiment of the present disclosure, a .po message file is a plain-text file, representing a single language that contains all available translation strings and their interpretation (translation) in the given language. It will be appreciated that a .po message file may be made up of many entries, each entry describing the relation between an original untranslated string and its corresponding translation:

msgid "Original translation string is here"
msgstr "Transtated string is here"

In step 320, the process determines whether a string msgid already exists in a database (e.g. database 656). If the msgid exists, the process returns to step 310. Otherwise, the process gathers localization patterns in step 330. Then, the process saves the localization patterns into database 656 and sends a report 212 to a responsible party, such as, for example, a technical writer in step 340. It will be appreciated that report 212 contains newly added localization patterns that can be analyzed by developer or technical writer to exclude it and make an exception to not recognize such string(s) as localization patterns. In step 350, the process determines whether it has reached the end of file (EOF) of the .po message file. If the EOF has been reached, the process ends in step 360. Otherwise, the process returns to step 310.

Figure 4:
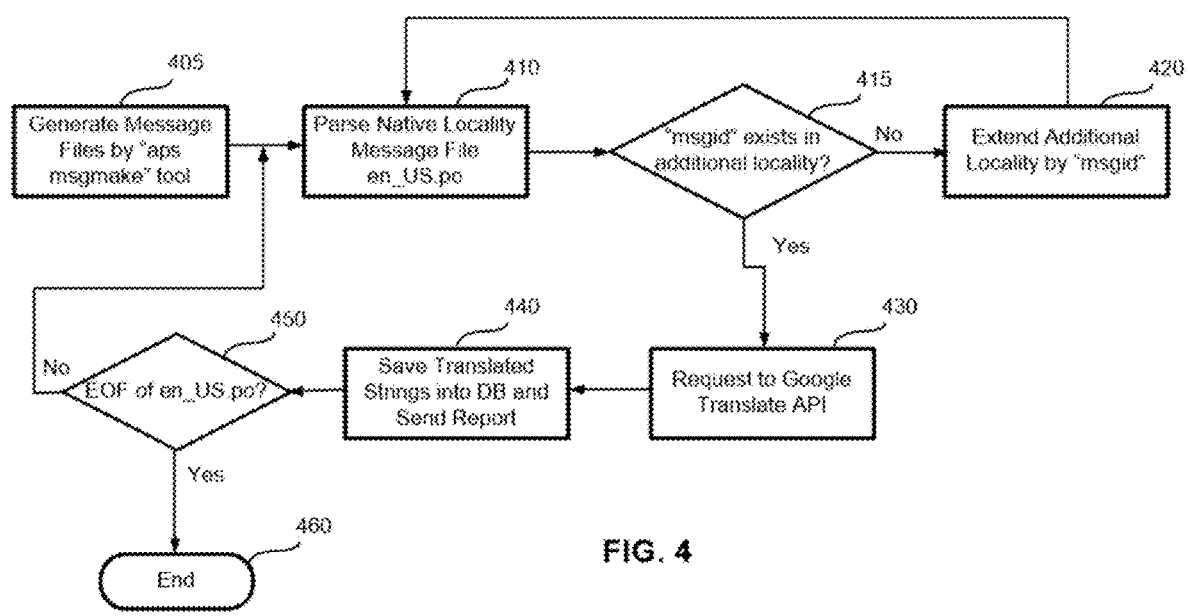
FIG. 4 displays a flowchart of a method for automated detection, correction, and translation of un-localized lines.

Referring now to FIG. 4, there is shown a flowchart of a method for the automated internationalization of lines in a source code populating a database with localization samples, in accordance with one embodiment of the present disclosure. In step 405, .po message files are generated by an aps msgmake tool as disclosed above. In at least on embodiment, *po files can be retrieved from the previous stage after working of source code analyzer (second iteration of 204 step). In at least one embodiment of the present disclosure, the aps msgmake command extracts the translation strings into .po message files, one file per language. This file is a convenient way for translators to provide the interpretation of the translation strings in the target language. The aps msgmake, utility uses a special trap (i.e., a hook) in order to derive localization data from a set of aps command line tools for assembling a GUI.

In at least one embodiment of the present disclosure, the process automatically creates a plurality of .po message files for each locality where a translation is desired. It will be further appreciated that the .po message file for each locality comprises the each msgid that needs to be translated. In step 410, a native locality .po message file is parsed as disclosed in step 310. If, in step 415, the msgid exists in an additional locality, the process sends the msgid via a request to a translation engine, such as, for example, the Google Translate API, via network 658 in step 430, and receives a translated string. Otherwise, the process extends the additional locality 420 by the msgid (i.e. the process adds the msgid to the additional locality if necessary) and moves to step 410. Then, in step 440, the process saves the translated strings into a message file, the message file being provided for each additional locale and into database (e.g. database 656) and sends a report. In step 450, the process checks if it has reached the end of file (EOF) of the .po message file. If the EOF has been reached, the process ends in step 460. Otherwise, the process returns to step 410.

Figure 5:
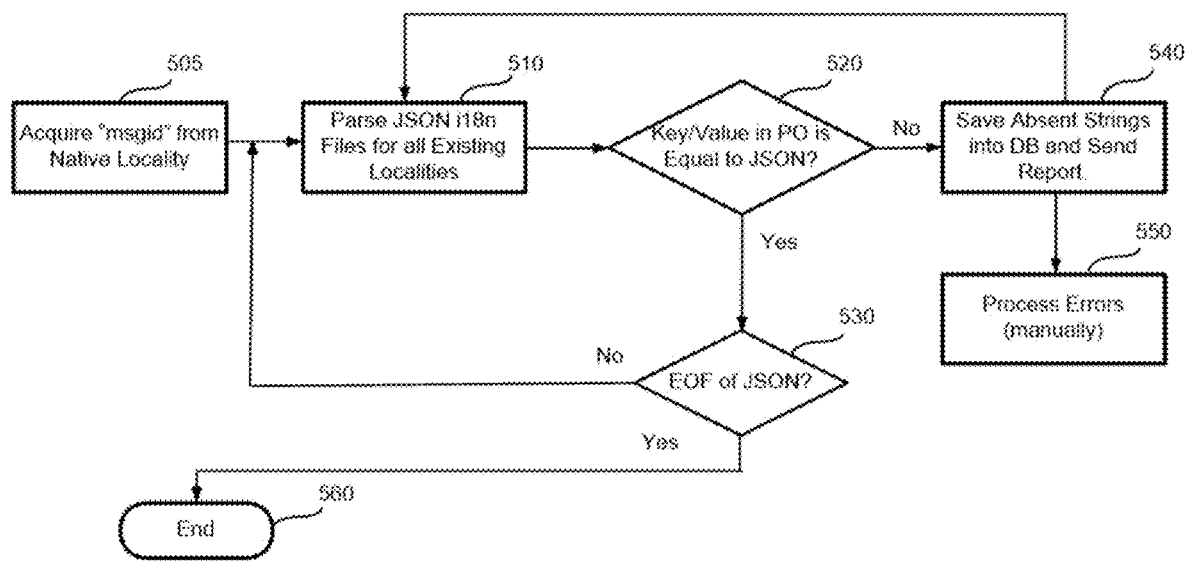
FIG. 5 displays a flowchart of a method for automated detection, and validation of propagation lines.

Referring now to FIG. 5, there is shown a flowchart of a method for validation of lines between .po message files and JSON, in accordance with the exemplary embodiment. In step 505, the process acquires a msgid from the .po message file for a native locality. In step 510, the process parses a locality reference file (i.e. JSON i18n files) for all existing localities. In step 520, the process determines whether a key/value in the .po message file is equal to the locality reference file (i.e. the JSON i18n file) except native locale where values are emty by default. So, for the native locale compares only values of keys. If the key/value in the .po message file is equal to the locality reference file, the process determines whether the JSON (locality reference file) file has reached the end of file (EOF) in step 530. If the JSON file has reached the end of file (EOF), the process ends in step 560. Otherwise, the process moves to step 510. If, in step 520, key/value in the .po message file is NOT equal to the locality reference file, the process saves absent strings into a database 656 and sends a report to a responsible party (e.g. the responsible technical writer) in step 540 and moves to step 510. In step 550, the errors are processed manually.

Figure 6:
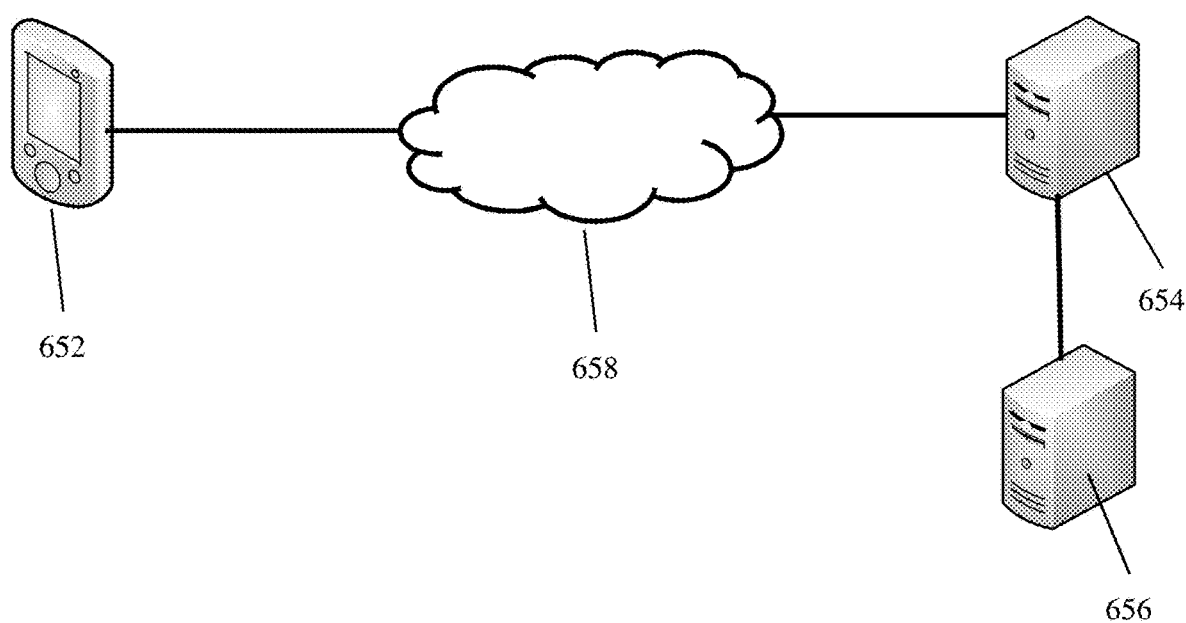
FIG. 6 displays a schematic drawing of a method for automated detection, correction, and translation of un-localized lines.

Referring to FIG. 6, there is shown a system and components for automated detection, correction, and translation of un-localized lines, generally at 650. This description is presented in terms of programs, data structures or procedures executed on a computer or network of computers. The software programs implemented by the system may be written in any programming language—interpreted, compiled, or otherwise. These languages may include, but are not limited to, PHP, ASP.net, HTML, HTML5, Ruby, Perl, Java, Python, C++, C #, JavaScript, and/or the Go programming language. It should be appreciated, of course, that one of skill in the art will appreciate that other languages may be used instead, or in combination with the foregoing and that web and/or mobile application frameworks may also be used, such as, for example, Ruby on Rails, Node.js, Zend, Symfony, Revel, Django, Struts, Spring, Play, Jo, Twitter Bootstrap and others. It should further be appreciated that the systems and methods disclosed herein may be embodied in software-as-a-service available over a computer network, such as, for example, the Internet. Further, the present disclosure may enable web services, application programming interfaces and/or service-oriented architectures through one or more application programming interfaces or otherwise.

FIG. 6 shows a system for automated detection, correction, and translation of un-localized lines. In at least one embodiment of present disclosure, the system comprises a user GUI 652, server 654, database 656, and computer network 658.

The user GUI 652 may be configured to transmit information to and generally interact with a web service and/or application programming interface infrastructure housed on server 654 over computer network 658. The user GUI 652 may include a web browser, mobile application, socket or tunnel, or other network connected software such that communication with the web services infrastructure on server 654 is possible over the computer network 658.

The user GUI 652 includes one or more computers, smartphones, tablets, wearable technology, computing devices, or systems of a type well known in the art, such as a mainframe computer, workstation, personal computer, laptop computer, hand-held computer, cellular telephone, MP3 player, or personal digital assistant. The user GUI 652 comprises such software, hardware, and componentry as would occur to one of skill in the art, such as, for example, one or more microprocessors, memory systems, input/output devices, device controllers, and the like. The user GUI 652 also comprises one or more data entry means (not shown in FIG. 6) operable by customers of the user GUI 652 for data entry, such as, for example, voice or audio control, a pointing device (such as a mouse), keyboard, touchscreen, microphone, voice recognition, and/or other data entry means known in the art. The user GUI 652 also comprises a display means which may comprise various types of known displays such as liquid crystal diode displays, light emitting diode display, and the like upon which information may be displayed in a manner perceptible to the customers. It will be appreciated that user GUI 652 may further comprise such software, hardware, and componentry as would occur to one of skill in the art, to operably perform the functions allocated to the user GUI 652 in accordance with the present disclosure.

The database 656 is configured to store information generated by the system and/or retrieved from one or more information sources. In at least one embodiment of the present disclosure, database 656 can be "associated with" server 654 where database 656 resides on server 654. Database 656 can also be "associated with" server 654 where database 656 resides on a server or computing device remote from server 654, provided that the remote server or computing device is capable of bi-directional data transfer with server 654, such as, for example, in Amazon AWS, Rackspace, or other virtual infrastructure, or any business network. In at least one embodiment of the present disclosure, the remote server or computing device upon which database 656 resides is electronically connected to server 654 such that the remote server or computing device is capable of continuous bi-directional data transfer with server 654.

For purposes of clarity, database 656 is shown in FIG. 6, and referred to herein as a single database. It will be appreciated by those of ordinary skill in the art that database 656 may comprise a plurality of databases connected by software systems of a type well known in the art, which collectively are operable to perform the functions delegated to database 656 according to the present disclosure. Database 656 may also be part of distributed data architecture, such as, for example, a Hadoop architecture, for big data services. Database 656 may comprise relational database architecture, noSQL, OLAP, or other database architecture of a type known in the database art. Database 656 may comprise one of many well-known database management systems, such as, for example, MICROSOFT's SQL Server, MICROSOFT's ACCESS, MongoDB, Redis. Hadoop, or IBM's DB2 database management systems, or the database management systems available from ORACLE or SYBASE. Database 656 retrievably stores information that is communicated to database 656 from user GUI 652 or server 654.

Having thus described an embodiment, it should be apparent to those skilled in the art that certain advantages of the described method and system have been achieved. It should also be appreciated that various modifications, adaptations, and alternative embodiments thereof may be made within the scope and spirit of the present disclosure. The disclosure is further defined by the following claims.

What is claimed is:

1. A method for automated detection, correction, and translation of un-localized lines in source code, the method comprising the steps of:
   receiving at least one source code file;
   parsing the at least one source code file to generate at least one message file, wherein the parsing determines a plurality of localization patterns associated with the message file by performing the steps of:
      determining a plurality of localization patterns in the at least one source file;
      saving the localization patterns into a database
      for each localization pattern, identifying message ids associated with the localization pattern, and
      generating the at least one message files wherein the generating comprises:
         generating a respective message file associated with at least one locality from the at least one source code file, wherein the respective message file contains:
      at least one message id, at least one location of the message id in the at least one source file, a plurality of entries, each entry corresponding to a respective translated string;
      and an untranslated string corresponding to the plurality of translations indicated by the plurality of entries;
   subsequent to generating the message files, parsing each of the at least one message files to retrieve the at least one message id;
   for each retrieved message id, checking whether the retrieved message id encompasses to an additional language file;
   for each message id that does not encompass the additional language file, performing the steps of:
      requesting a translation of the untranslated string to a translation service of the translation engine;
      receiving a translated code string from the translation service; and
      recording the translated code string as an entry associated with the untranslated string in the message id database:
   subsequent to the recording, validating the recorded translated code string with keys of a JSON file, wherein the validating comprises:
      parsing the plurality of message files to verify if the plurality of message files have the same message id and translated code string as the keys of the JSON file;
      if the validation is incorrect, generating an automated report to a reviewing party; and
      if the validation is incorrect, allowing a developer to correct the mistakes through reporting.

2. The method of claim 1, wherein the native locality message file is en_US.po file.

3. The method of claim 1, wherein the translation service is requested using a translation utility application programming interface.

4. The method of claim 1, wherein correcting mistakes comprises one of automatically correcting errors found by the script, and manually correcting errors found by propagation errors between message files and local files.

\* \* \* \* \*